Dec. 1, 1970   K. B. K. A. LUNDBERG   3,544,185
CABINET COMPRISING SEPARATE PARTS TO BE ASSEMBLED
Filed June 24, 1968
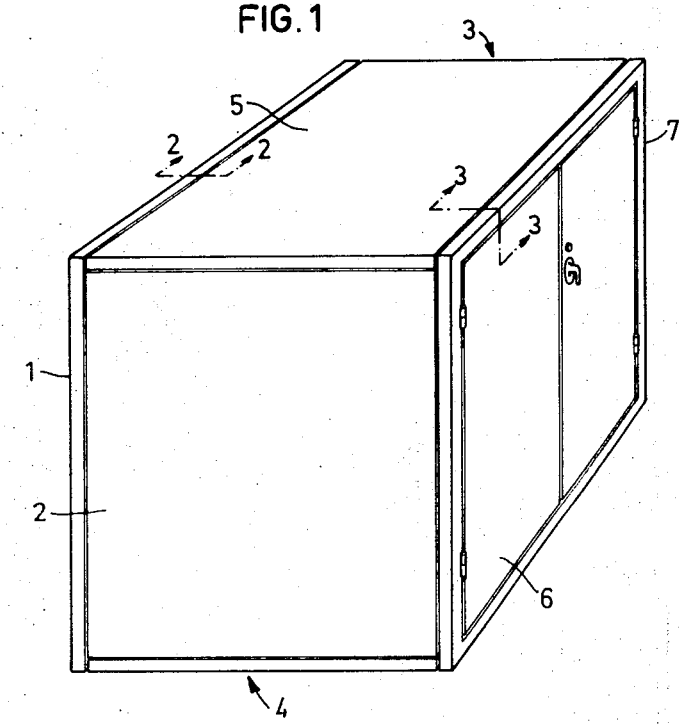
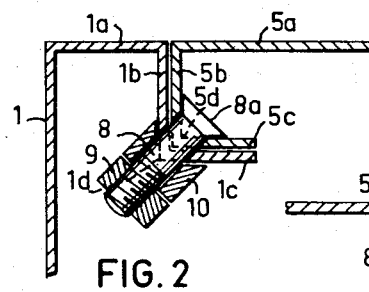
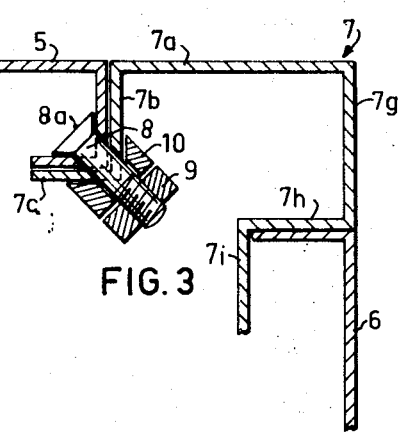
INVENTOR.
KURT BONNIE KARL AXEL LUNDBERG
By Young & Thompson
ATTYS.

United States Patent Office
3,544,185
Patented Dec. 1, 1970

3,544,185
CABINET COMPRISING SEPARATE PARTS TO BE ASSEMBLED
Kurt Bonnie Karl Axel Lundberg, Malarvagen 1, Segeltorp, Sweden
Filed June 24, 1968, Ser. No. 739,298
Int. Cl. A47b 47/02
U.S. Cl. 312—263                4 Claims

ABSTRACT OF THE DISCLOSURE

A cabinet comprises separate parts to be assembled, the abutting edges of two parts having interengaging flanges of U-shape and Z-shape, respectively. A bolt is passed through the intermediate corners between the legs of the flanges so as to form an angle of substantially 45 degrees with the main portions of the said parts when assembled. A washer having a V-shape portion fits said bolt and receives one of the said corners. A nut tightens the bolt.

---

The present invention refers to cabinets comprising separate parts to be assembled to form a back, two side walls, a bottom, a top and a front provided with one or several doors, the abutting edges of two separate parts having portions flush with each other and bent to constitute flanges interengaging one another along two legs and an intermediate corner.

An object of the invention is to provide a new and improved cabinet of the kind described which can be readily and economically manufactured, quickly assembled, which is rigid and durable in construction, which can be easily disassembled and which possesses no protruding parts collecting dust and which is as safe as a welded cabinet when the doors are locked.

According to the invention one of said flanges together with the said portion of the first part forming a Z-shape profile, and the other flange forming a U-shape profile with the said portion of the second part, a bolt passing through the intermediate corners of the two flanges and cooperating with a washer and a nut, said washer having a V-shape portion to receive the corner of one of said flanges, so that when the nut is tightened both the corner edges and the legs of the flanges are urged towards each other.

In a cabinet as per the invention all walls may, if desired, be united by means of similarly shaped joints, whereby the manufacture of the cabinet parts is simplified considerably. Moreover, the assembly of the cabinet is facilitated, since the profiled flanges of the various parts may easily be fitted together, the bolts inserted through the holes in the corner edges, the washers slipped on to the bolts and the nuts tightened. By the shape of the joints the parts will be united safely, the joints at the same time offering certain elastic flexibility both in the horizontal and the vertical direction.

One embodiment of the present invention will be described below with particular reference to the accompanying drawing. FIG. 1 is a perspective view of an assembled cabinet according to the invention. FIG. 2 is a sectional view of a joint between the back and the top taken on line 2—2 in FIG. 1. FIG. 3 is a sectional view of the junction taken on line 3—3 in FIG. 1, between the top and the front of the cabinet, said front also defining an opening for a door and providing a stop for the said door.

The cabinet shown in FIG. 1 comprises separate parts to be easily assembled, vis. a back 1, two side walls 2, 3, a bottom 4, a top 5 and a front 7 equipped with two doors 6.

All parts are united with each other by means of horizontally and vertically extending joints, whose general structure is shown in FIGS. 2 and 3. FIG. 2 illustrates the junction of the back 1 and the top 5 of the cabinet. The back 1 has a folded-over edge 1a, flush with an edge portion 5a of the top 5. The folded-over edge 1a continues into and is part of a flange which forms a profile substantially having Z-shape, while the top 5 has a folded-over flange, together with portion 5a constituting a profile of substantially U-shape.

The Z-shape profile has flange portions or legs 1b and 1c with the intermediate corner edge 1d, while the U-shape profile has flange portions or legs 5b, 5c with the intermediate corner edge 5d. A bolt 8 is passed through the corner edges 1d and 5d substantially at an angle of 45° towards the portions 1a, 5a. Onto the bolt 8 a washer 10 is fitted, having a V-shape portion to receive the corner edges 1d, 5d. The legs 1b, 1c, 5b, 5c of the flanges are urged towards each other when a nut 9 is tightened. The head of the bolt has a truncated quadrangular shape so as to be self-locking when inserted in said U-shape flange and said nut 9 is tightened.

In FIG. 3 a similar joint between the top 5 and the front 7 is shown. Also here the top has a U-shape profile flange. This profile engages a Z-shape profile comprising profile portions or legs 7b, 7c. The Z-shape profile of the front continues into a further Z-shape profile comprising profile portions or legs 7g, 7h, 7i. The leg 7g constitutes the actual front part, while the leg 7h defines an opening for the door 6 and the leg 7i provides a stop for the said door. The front may, thus, be stated to consist of four corner profiles each one comprising two combined Z-profiles.

In practice the side walls have U-shaped profile portions all around, whereas the front and back have Z-shape profile portions all around. The top and the bottom have both U-shape profile portions and Z-shape profile portions, the former engaging Z-shape profile portions of the front and the back, the latter engaging U-shape profile portions of the side walls, respectively.

By means of the bolt, washer and nut assembly described the cabinet parts can be efficiently secured together. When mounting the parts, however, there is certain flexibility prevailing in the junctions which makes the assembly easy. When mounted all outer surfaces of the cabinet are plane having no protruding parts, the cabinet simultaneously being wholly dust-proof. Neither may a cabinet wall be unscrewed from the exterior which makes the cabinet as safe as a welded cabinet.

What I claim is:
1. A cabinet comprising separate parts to be assembled to form a back, two side walls, a bottom, a top and a front provided with one or several doors, the abutting edges of two separate parts having portions flush with each other and bent to constitute flanges interengaging one another along two legs and an intermediate corner, wherein one of said flanges together with the said portion of the first part forming a Z-shape profile, and the other flange forming a U-shape profile with the said portion of the second part, a bolt passing through the intermediate corners of the two flanges and cooperating with a washer and a nut, said washer having a V-shape portion to receive the corner of one of said flanges, so that when the nut is tightened both the corner edges and the legs of the flanges are urged towards each other.

2. A cabinet as claimed in claim 1, wherein a front part equipped with at least one door by means of a Z-shape profile portion is adapted to be united with U-shape profile portions of the top, bottom and the side walls, respectively, said front part comprising another Z-shape profile portion defining an opening for said door simultaneously providing a stop therefor.

3. A cabinet as claimed in claim 1, wherein said side walls have U-shape profile portions all around and said back and front have Z-profile portions all around, whereas said top and bottom have Z-shape profile portions engaging said U-shape profile portions of the side walls, said top and bottom also having U-shape profile portions engaging said Z-shape profile portions of the back and front, respectively.

4. A cabinet as claimed in claim 1, wherein the head of said bolt is inserted within the U-shape profile portion and has a truncated quadrangular shape so as to be self-locking within said corner.

References Cited

UNITED STATES PATENTS

| 1,157,469 | 10/1915 | Von Philip | 189—287.36 |
| 2,764,266 | 9/1956 | Haworth | 189—287.36 F |
| 3,285,633 | 11/1966 | Houvener | 52—584 |
| 3,432,196 | 3/1969 | Marchiorello | 52—584 X |

JAMES T. McCALL, Primary Examiner

U.S. Cl. XR.

108—156